(12) United States Patent
Ravishankar

(10) Patent No.: US 11,588,542 B2
(45) Date of Patent: Feb. 21, 2023

(54) SYSTEM AND METHOD FOR IMPROVING LINK PERFORMANCE WITH GROUND BASED BEAM FORMER

(71) Applicant: Channasandra Ravishankar, Clarksburg, MD (US)

(72) Inventor: Channasandra Ravishankar, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/952,657

(22) Filed: Nov. 19, 2020

(65) Prior Publication Data

US 2021/0152236 A1 May 20, 2021

Related U.S. Application Data

(60) Provisional application No. 62/937,948, filed on Nov. 20, 2019.

(51) Int. Cl.
*H04B 7/155* (2006.01)
*H04B 7/06* (2006.01)
(Continued)

(52) U.S. Cl.
CPC ......... *H04B 7/1555* (2013.01); *H04B 7/0695* (2013.01); *H04B 7/10* (2013.01); *H04B 7/1855* (2013.01); *H04B 7/18558* (2013.01)

(58) Field of Classification Search
CPC ...... H04B 7/0695; H04B 7/10; H04B 7/1555; H04B 7/1855; H04B 7/18558; H04B 7/18517; H04B 7/2041
See application file for complete search history.

(56) References Cited

U.S. PATENT DOCUMENTS 10,158,420 B1 * 12/2018 Montsma ............. H04B 7/1858
2005/0207375 A1 * 9/2005 Schiff ................ H04B 7/18534
370/331
(Continued)

FOREIGN PATENT DOCUMENTS

EP          1091506 A2    4/2001
WO     2018075962 A1    4/2018

OTHER PUBLICATIONS

International search report for PCT Application No. PCT/US2020/061252.
(Continued)

*Primary Examiner* — David B Lugo
(74) *Attorney, Agent, or Firm* — Capitol City TechLaw; Jasbir Singh

(57) ABSTRACT

A method and system for improving link performance for a user terminal (UT) in a satellite network is disclosed. The method including: providing a first beam servicing a first service area that is adjacent a second service area serviced by a second beam; transmitting, from the first service area, a transmission via the first beam to a receiver via a satellite; beamforming the first beam and the second beam at the receiver; extracting the first beam and a remnant signal of the first beam from the second beam; and processing the first beam and the remnant signal to receive the transmission, wherein the remnant signal may include a portion of the transmission received by a second beam antenna of the satellite.

21 Claims, 3 Drawing Sheets

(51) Int. Cl.
    *H04B 7/10*     (2017.01)
    *H04B 7/185*    (2006.01)

(56) References Cited

U.S. PATENT DOCUMENTS

| | | | |
|---|---|---|---|
| 2015/0087299 A1* | 3/2015 | Veysoglu | H04B 7/18539 |
| | | | 455/429 |
| 2015/0271730 A1* | 9/2015 | Benammar | H04W 36/14 |
| | | | 455/436 |
| 2016/0372820 A1* | 12/2016 | Collignon | H01Q 1/38 |
| 2019/0033464 A1 | 1/2019 | Vasavada et al. | |
| 2019/0334253 A1* | 10/2019 | Corman | H01Q 1/27 |

OTHER PUBLICATIONS

Kondo H et al: "Frequency shared access control for multi-beam mobile satellite communication systems", Discovering a New World of Communications. Chicago, Jun. 14-18, 1992; [Proceedings of the International Conference on Communications], New York, IEEE, US, vol.—, Jun. 14, 1992 (Jun. 14, 1992), pp. 755-759, XP010062012, DOI: 10.1109/ICC.1992.268183 ISBN: 978-0-7803-0599-1.

Shubo Ren et al: "Multi-beam Joint Detection Combination for TD-SCDMA Compatible Mobile Satellite CommunicationSystem", Control Engineering and Communication Technology (ICCECT), 2012 International Conference on, IEEE, Dec. 7, 2012 (Dec. 7, 2012), pp. 944-947, XP032311321, DOI: 10.1109/ICCECT.2012. 121ISBN: 978-1-4673-4499-9.

* cited by examiner

SYSTEM AND METHOD FOR IMPROVING LINK PERFORMANCE WITH GROUND BASED BEAM FORMER

CROSS-REFERENCE TO RELATED APPLICATIONS

The present application claims the benefit under 35 U.S.C. 119(e) of U.S. Provisional Application Ser. No. 62/937,948, filed Nov. 20, 2019, which is incorporated herein by reference in its entirety.

FIELD

The present teachings use a ground-based beam former to improve a signal to noise ratio of a transmit signal. A ground-based beam former may be used to improve link performance and availability when diversity of beams, polarization or satellites is available.

BACKGROUND

A multibeam satellite system employs frequency reuse in which different beams share the same frequency resource or bandwidth. Beams sharing bandwidth are known as co-channel beams. The closer the two co-channel beams are located geographically, the greater is the co-channel interference (CCI). CCI can have devastating impact on the performance, hence prior art systems mitigate CCI to maintain CCI at acceptable levels by typically employing a reuse factor where a total system bandwidth B is divided into equal parts. The reuse may take advantage of opposite circular polarizations (left-hand and right-hand) to mitigate CCI on each antenna polarization.

Small terminals such as cell phones operate with low transmission power. Moreover, the small terminals generally use omnidirectional antennas that do not extend beyond a chassis of the mobile device. Closing a transmit link from the small terminals to a satellite is a challenge. This challenge is further exacerbated by a mobility of the small terminal. Under such deployments, users at the edge of the co-channel cells experience severe CCI which adversely affects their ability to close a link, data rate and quality of service.

The CCI mitigation techniques applied at the satellite gateway such as precoding and beamforming are well known. Multiple beams are formed using an array of on-board feed elements by means of phased array beamforming. A Dynamic Beamforming Network (DBN) where the spot-beams can be added, deleted or repositioned to cater to hot-spot scenarios is implemented via a GBBF (Ground Based Beam Forming) technology. GBBF permits a greater flexibility and makes possible the use of more advanced, and computationally intensive, beamforming processes that lead to the use of a smaller frequency reuse factor and hence an improved bandwidth efficiency. In GBBF, multiple paths (one for each feed element) are maintained between the output of the DBN located on the ground and each feed element located on the spacecraft. GBBF mitigates CCI by introducing amplitude and phase offsets into the paths prior to sending to a feeder channel to the on-board feed elements to form the directional spot beams.

BRIEF SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings use a ground-based beam former to improve a signal to noise ratio of a transmit signal. A ground-based beam former may be used to improve link performance and availability when diversity of beams, polarization or satellites is available.

A method for improving link performance for a user terminal (UT) in a satellite network is disclosed. The method including: providing a first beam servicing a first service area that is adjacent a second service area serviced by a second beam; transmitting, from the first service area, a transmission via the first beam to a receiver via a satellite; beamforming the first beam and the second beam at the receiver; extracting the first beam and a remnant signal of the first beam from the second beam; and processing the first beam and the remnant signal to receive the transmission, wherein the remnant signal may include a portion of the transmission received by a second beam antenna of the satellite. Other embodiments of this aspect include corresponding computer systems, apparatus, and computer programs recorded on one or more computer storage devices, each configured to perform the actions of the methods.

In some embodiments, the method may include one or more of the following. In the method the first beam may include a return link. In the method the remnant signal may include a side-lobe of the transmission or a signal below 3 dB of a main-lobe peak of the transmission. In the method the transmission may include a linearly polarized signal and the satellite maps the linearly polarized signal to a circularly polarized signal. The transmission may include a linearly polarized signal and the satellite maps the linearly polarized signal to two circularly polarized signals. The first beam and the second beam are diverse by a carrier frequency, a polarization or a combination thereof. The satellite may include a first satellite to service the first beam and a second satellite to service the second beam. In the method the processing may determine that communication via the first satellite is blocked, when the first beam may include a zero signal and a portion of the remnant signal attributable to the second satellite comprises a non-zero signal.

A system to improve link performance for a user terminal (UT) in a satellite network is disclosed. The system including: a satellite to receive a first beam servicing a first service area that is adjacent a second service area serviced by a second beam; a UT (user terminal) to transmit, from the first service area, a transmission via the first beam to a receiver via the satellite; a GBBF (Ground based beam former) to beamform the first beam and the second beam at the receiver; a gateway to extract the first beam and a remnant signal of the first beam from the second beam; and a Base Station to process the first beam and the remnant signal to receive the transmission, wherein the remnant signal may include a portion of the transmission received by a second beam antenna of the satellite.

Additional features will be set forth in the description that follows, and in part will be apparent from the description, or may be learned by practice of what is described.

BRIEF DESCRIPTION OF THE SEVERAL VIEWS OF THE DRAWINGS

In order to describe the manner in which the above-recited and other advantages and features may be obtained, a more particular description is provided below and will be rendered by reference to specific embodiments thereof which are illustrated in the appended drawings. Understanding that these drawings depict typical embodiments and are not, therefore, to be limiting of its scope, implementations will be described and explained with additional specificity and detail with the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Figure 1A:
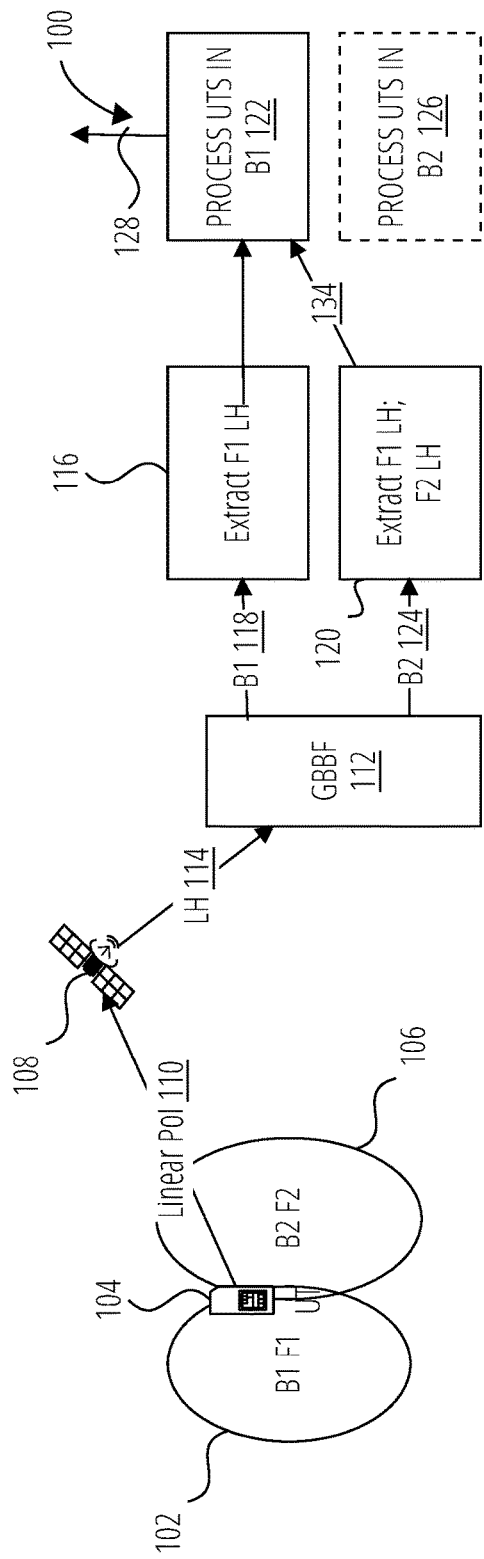
FIG. 1A illustrates a satellite network including a GBBF to improve signal acquisition with beam diversity, according to various embodiments.

A system and method for closing and maintaining a transmit link from a small terminal to the satellite, for example, a high throughput, higher latency satellite is needed. A ground-based beam former may be used to improve link performance and availability when diversity of beams, polarization or satellites is available.

The present teachings may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the tunnel may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Introduction

Multiple satellites may service a common coverage area. For example, two S-band satellites (T1 and the ICO) cover North America. However, the two S-band assets have different characteristics and capabilities. An integrated system that uses signals from both assets can improve link performance and availability.

If a first satellite were to fail, a second satellite could act as back up at least in those service areas where links can close. Even when the first satellite does not fail, the two satellites may be used in an integrated manner to improve link and availability performance. In some embodiments, when link information associated with the first satellite is used to improve link margins and availability (for example, with polarization and beam diversity) in a return link, the second satellite can augment this improvement using satellite diversity. In some embodiments, beam diversity may be applied to the return link with satellite diversity.

In some embodiments, when the first satellite is shadowed or blocked from the perspective of a user terminal, the second satellite may provide an alternate path to the network, for example, when both the satellites are in the same band like the S-band.

The beam definitions of the second satellite and the first satellite can be such that they can complement each other and as such the complementing definition can reduce the CCI. In some embodiments, a center of the beams from the second satellite may be disposed at or near the corners or edges of service areas of the beams associated with the first satellite. As such, beam roll off effects can be mitigated effectively in addition to beam diversity.

In some embodiments, for a return link, the reception of signals from the two satellites are asynchronous. Timing synchronization between signals from the two satellites may be achieved with knowledge of relative positions of the second satellite and the first satellite as well as a UT geolocation (coarse or fine).

In some embodiments, Pointing Beacon Stations (PBS) for one of the satellites may have sufficiently directional antennas such that frequencies used by the PBS do not interfere with the first satellite. In one embodiment, a 50 kHz channel can be set aside for the PBS.

In some embodiments, forward link transmissions from the two satellites may be orthogonal in time or orthogonal in frequency. In communications systems, the return link (also reverse channel or return channel) is the transmission link from a user terminal to a gateway (central hub). In contrast, a return link (also return channel) is the transmission link from the gateway to the user terminal. Return and forward links are distinct from uplinks and downlinks in satellite communication systems. Return and forward channels are distinct from, and should not be confused with, uplinks and downlinks in satellite communication systems. For example, satellite internet access with conventional bent-pipe transponders require a total of two uplinks and two downlinks. One uplink and downlink pair are used for the forward link from the gateway through the satellite to the user terminal, and another uplink/downlink pair are used for the return link from the user terminal to the gateway.

A UT may perform diversity selection or combining of service between the satellites. A transmission through the second satellite may be selectively done by observing if the return link signal is only arriving through the second satellite for a given user device or for all devices.

The Base Station continuously monitors the signal quality and CRC associated with different beams, polarizations and satellites to determine whether link through a particular satellite is blocked. If the link is deemed blocked from one of the satellites, the Base Station transmits through the visible satellite to UT. The link information includes a signal-to-noise ratio (SNR) of a beam measured by a UT. Signal-to-noise ratio is defined as the ratio of the power of a signal (meaningful input) to the power of background noise (meaningless or unwanted input) or $P_{signal}/P_{noise}$ where P is average power. Both signal and noise power must be measured at the same or equivalent points in a system. In some embodiments, link information for each link may include EsNo (energy per symbol to noise power spectral density) feedback between a gateway and a UT. Further details on GBBFs may be found in US Patent Publication No. 2019/0033464 entitled "PLACEMENT OF CALIBRATION EARTH STATIONS FOR GROUND BASED BEAM FORMING IN A SATELLITE SYSTEM".

A UT may be mobile device that operates with linear polarization of the radio signal. Some UTs may support circular polarizations, namely, left-handed (LH) and right-handed (RH) circular polarizations. Similarly, a satellite may operate with linear or circular polarization. When the polarizations of the satellite and the UTs don't match, for example, when the UT only operates with linear polarization and the satellite operates with circular polarization, the satellite may receive the linear transmissions from the UT on one or both of the circular polarizations. A linear polarization may be treated as a sum of the LH and RH polarizations, and one or both of the polarizations may be relayed by the satellite to a gateway.

Generally, a GBBF provides an output for each beam it processes. The GBBF output for beam 1 may magnify the beam 1 transmissions while suppressing transmissions over the other beams. However, the beam 1 output still includes a remnant of other concurrently beams received at the GBBF. The remnants may be processed to improve the signal from the UTs serviced by the particular beam. In one embodiment, when a UT is disposed in a first service area while being close to the edge shared by the first service area and a Second service area a 3, 6, 9 or more decibel (dB) improvement in an SNR may be experienced. In one embodiment, the edge of a service area may include the area in the outer one third radius region away from a beam center of a service area.

Very high throughput satellite (VHTS) and cellular systems achieve high capacity by organizing a service area into a plurality of cells and reusing the available spectrum multiple times over the service area. Spectrum reuse is made possible by the ability to form narrow beams with a high directivity over each cell and low sidelobes over other cells. As the far field antenna patterns overlap at the receivers (being either the coverage area or the satellite), every transmitted beam is received by every receiver. For example, beam 1 may be received by a satellite antenna intended for beam 1 and beam 1 may also be received by a satellite antenna intended for beam 2. As such, a remnant signal of each beam signal (likely a sidelobe or a signal below 3 dB of a main-lobe peak) may be measured within adjacent service area beams. The remnant signal does not need to be of sufficient power to obtain a signal lock.

FIG. 1A illustrates a satellite network including a GBBF to improve signal acquisition with beam diversity, according to various embodiments.

The Satellite network 100 comprises a first service area 102, a UT 104 disposed in the first service area 102, a Second service area 106, a satellite 108 and a GBBF 112. A Tx 110 signal (here a return path from the UT to a gateway) from the UT may be mapped on one of the circular polarizations, for example, LH polarization in FIG. 1A, by the satellite 108.

The GBBF 112 processes the LH 114 downlink from the satellite 108 which concurrently relays transmissions from UTs in the first service area 102 with Beam 1 (B1) at frequency F1, and the Second service area 106 with Beam 2 (B2) at frequency F2. The GBBF 112 outputs B1 118 and B2 124. The LH 114 downlink is manipulated by the GBBF 112 such that in the B1 118 signal output, the transmissions over B1 are magnified while other concurrent transmissions relayed by the satellite 108 are suppressed. Moreover, the LH 114 downlink is manipulated by the GBBF 112 such that in the B2 124 signal output, the transmissions over B2 are magnified while other concurrent transmissions relayed by the satellite 108 are suppressed. However, the B2 124 signal output still includes a remnant of beam 1 (for example F1 LH).

The Satellite network 100 may include a gateway 116 to extract F1 LH from the B1 118 and a gateway 120 to extract the signals F1 LH and F2 LH from the B2 124. In some embodiments, the gateway 116 may also extract F2 LH from the B2 124.

The Satellite network 100 may include a Base station 122 may be provided to process the F1 LH signal from both the gateway 116 and remnant signal 134 from the gateway 120, and outputs the Tx 110 from the UT 104 (disposed in first service area 102) as Base Station 126 with an improved SNR as compared to not extracting F1 LH from the B2 124, for example, a 3 dB improvement when UT 104 is disposed near an edge.

In some embodiments, UT 104 may circularly polarize its transmissions. The GBBF 112 may improve Base Station 126 in a manner similar to how the GBBF 112 improved Rx 128 from UT 104 when UT 104 is linearly polarized.

Figure 1B:
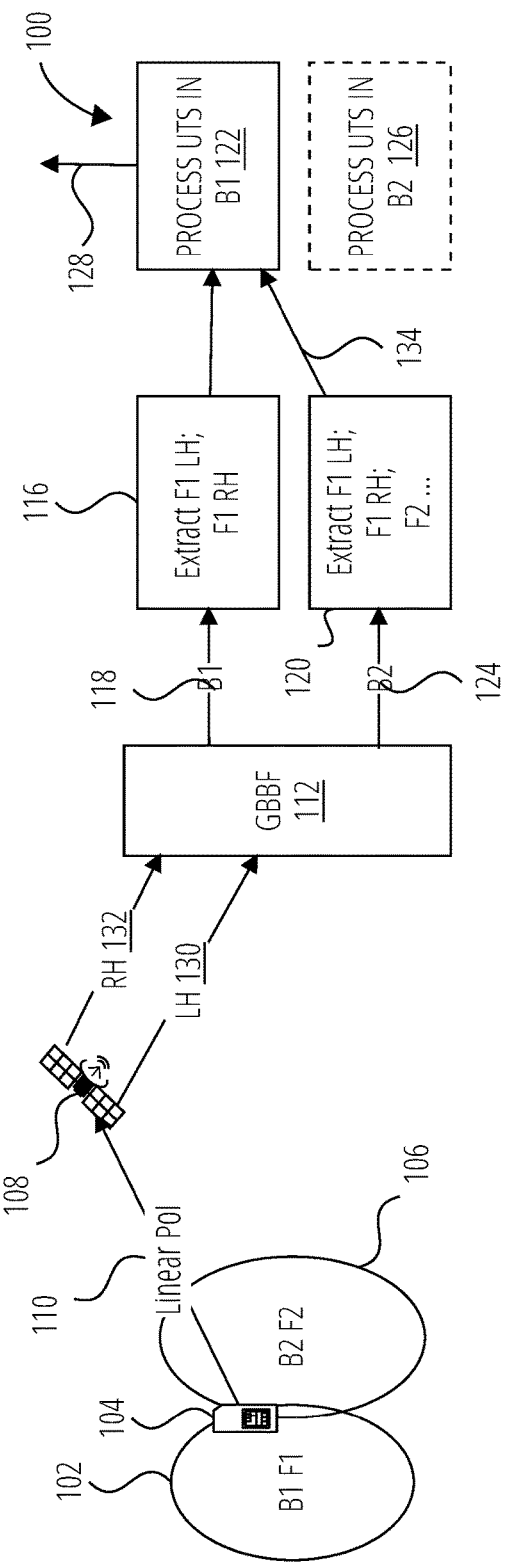
FIG. 1B illustrates a satellite network including a GBBF to improve signal acquisition with beam diversity, according to various embodiments.

FIG. 1B illustrates a satellite network including a GBBF to improve signal acquisition with beam diversity, according to various embodiments.

In some embodiments, the satellite 108 may relay a linearly polarized Tx 110 onto both poles, in other words, RH 132 and LH 130. The GBBF 112 processes RH 132 and LH 130 to output B1 118 and B2 124. Gateway 116 extracts F1 LH and F1 RH from B1 118, while gateway 120 extracts F1 LH, F1 RH, F2 LH and F2 RH from B2 124. Base station 122 processes the F1 LH and F1 RH signals (primary beam signal on B1 118 and remnant signal 134) from both the gateways, and outputs the Tx 110 from the UT 104 (disposed in first service area 102) as Rx 128 with an improved SNR as compared to not extracting F1 LH from the B2 124, for example, a 6 dB improvement when UT 104 is disposed near an edge.

Figure 2:
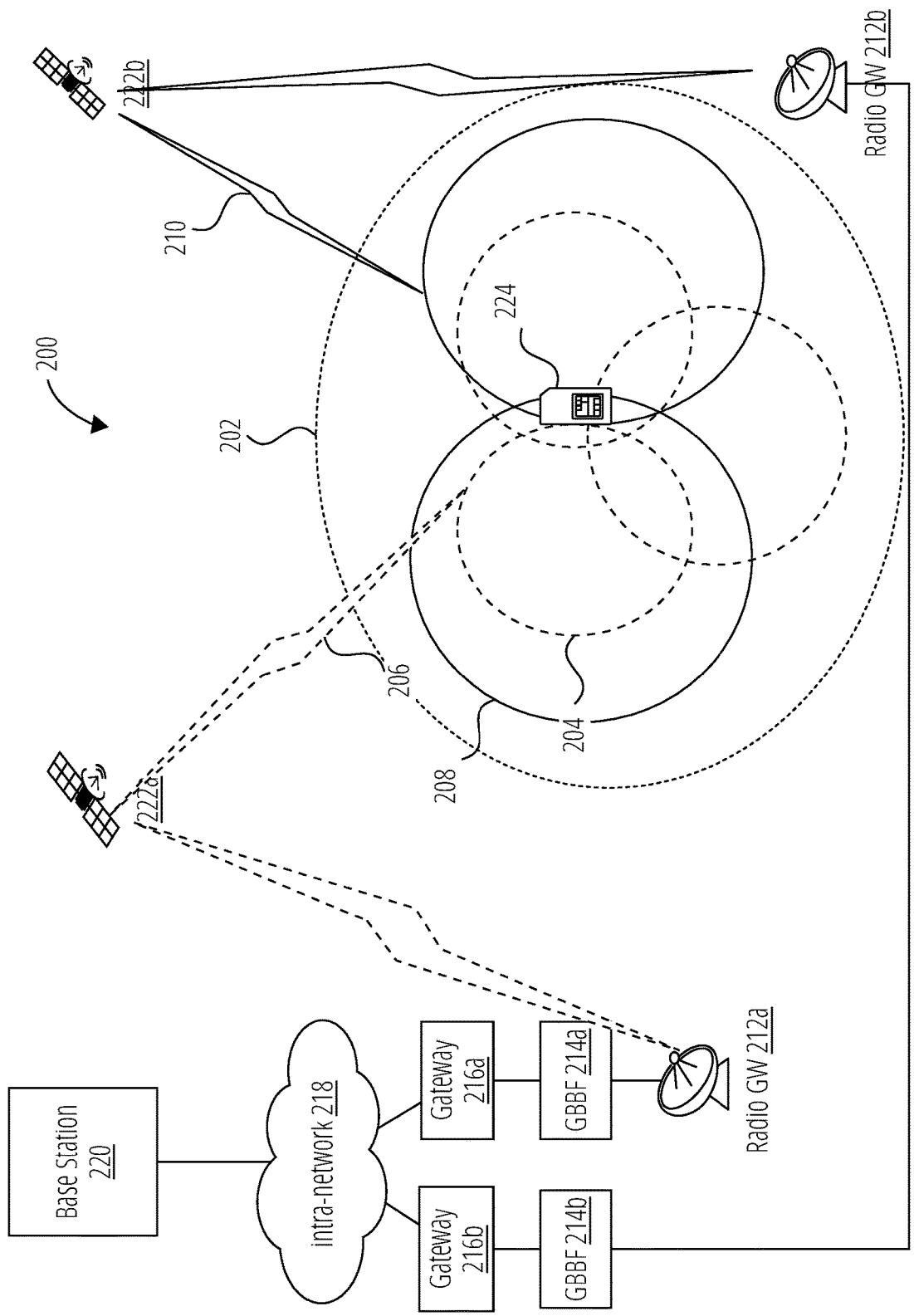
FIG. 2 illustrates a satellite network including a GBBF to improve signal acquisition with satellite diversity according to one embodiment.

FIG. 2 illustrates a satellite network including a GBBF to improve signal acquisition with satellite diversity according to one embodiment.

A satellite network 200 may include a satellite 222a, a satellite 222b and a User Terminal (UT) 124 disposed at a geolocation within a coverage area 202. The coverage area 202 may be tessellated into first service areas 204 serviced by first beams 206 from the first satellite 222a. The coverage area 202 may be tessellated into second service areas 108 serviced by second beams 210 from the second satellite 122b. The first service areas 204 may partially or fully overlap the second service areas 208. The first satellite 222a may communicate with the UT 224 via a radio GW 212a connected to a GBBF 214a, a Gateway 216a and a Base Station 220. Connections between the Gateway 216a and the Base Station 220 may use an intra-network 218 that may or may not span the internet. The second satellite 122b may communicate with the UT 224 via a radio GW 112b connected to a GBBF 214b, a GW 116b and the Base Station 220. Connections between the GW 116b and the Base Station 220 may use an intra-network 218 that may or may not span the internet.

When the satellite 222a and satellite 222b operate in the same band (for example, the S-band), the satellites receive and relay transmissions from UTs in an overlapping coverage area regardless of which satellite should be servicing a respective UT. As such, GBBF 214a and GBBF 214b beam outputs include signals meant for each other. For example, the Gateway 216b, servicing second satellite 222b, may extract remnant signal s meant for the first satellite 222a, i.e., S1 (satellite 1), F1, LH; S1, RH. The remnant signals may be communicated to Base Station 220 for processing. The remnant signal may be communicated to the Base Station 220 via the intra-network 218. In some embodiments, the remnant signals may be synchronized with the primary beam as delays in signal propagation between satellite 222a and satellite 222b may differ.

The coverage area 202. first service area 204 and second service area 208 are depicted as circles for illustration purposes. They may be shaped irregularly by the GBBF to minimize CCI and maximize coverage. The lines of the coverage area 202. first service area 204 and second service area 208 are the respective edges. Shapes of each of the coverage area 202. first service area 204 and second service area 208 may be distinct from another.

Figure 3:
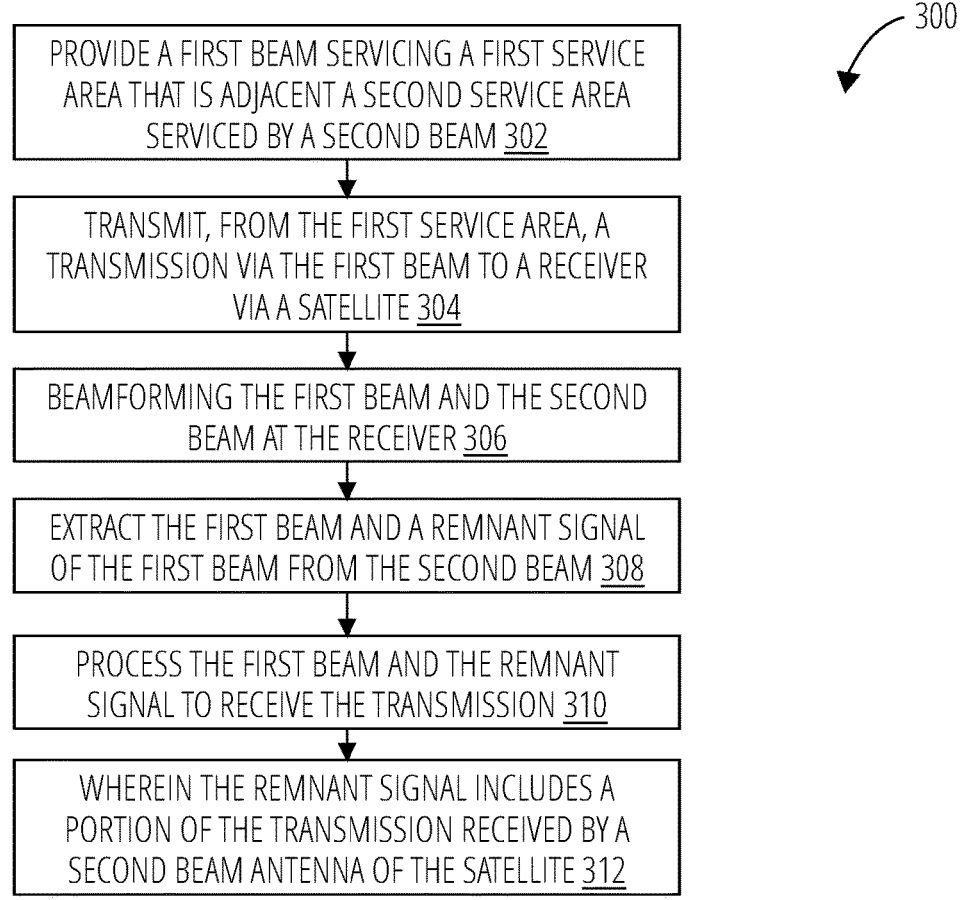
FIG. 3 illustrates a method for improving link performance for a user terminal (UT) in a satellite network in accordance with one embodiment.

FIG. 3 illustrates a method for improving link performance for a user terminal (UT) in a satellite network in accordance with one embodiment.

A method 300 to improve link performance for a satellite network is disclosed. In block 302, method 300 provides a first beam servicing a first service area that is adjacent a second service area serviced by a second beam. In block 304, method 300 transmits, from the first service area, a transmission via the first beam to a receiver via a satellite. In block 306, method 300 beamforms the first beam and the second beam at the receiver. In block 308, method 300 extracts the first beam and a remnant signal of the first beam from the second beam. In block 310, method 300 processes the first beam and the remnant signal to receive the transmission. In block 312, method 300 the remnant signal includes a portion of the transmission received by a second beam antenna of the satellite.

Figure 4:
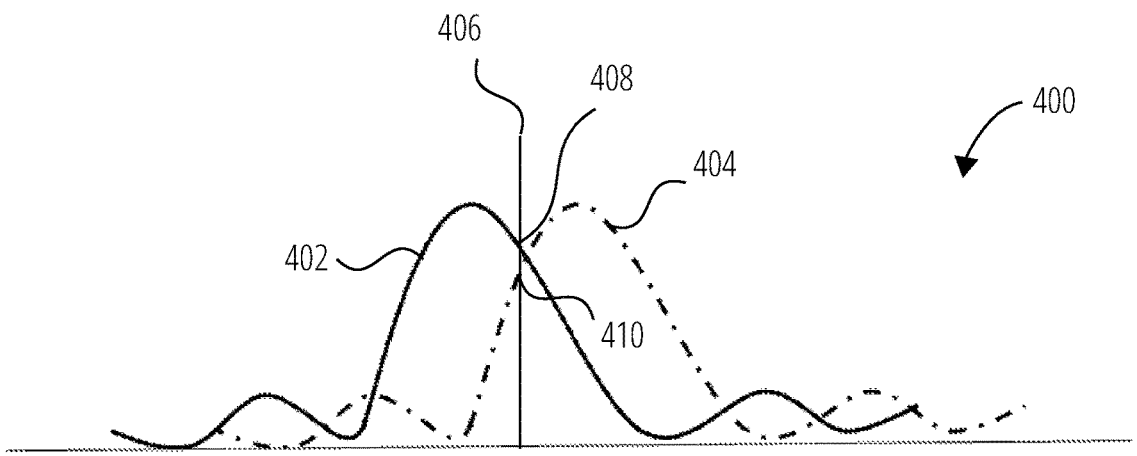
FIG. 4 illustrates two beams at GBBF outputs in some embodiments.

FIG. 4 illustrates two beams at GBBF outputs in some embodiments.

The GBBF output 400 includes a B1 response 402 and a B2 response 404. For a UT disposed at UT location 406, a UT signal in B1 at a GBBF's B1 output is indicated by point 408 on the B1 response 402 curve. For a UT disposed at UT location 406, a UT signal in B2 at a GBBF's B2 output is indicated by point 410 on the B2 response 404 curve. The remnant signal for the UT at UT location 406 (for example remnant signal 134) includes the UT signal in B2 at GBBF output 410. The remnant signal for the UT at UT location 406 may include a combination of all beams measurable at the UT location, for example, other beams from the same satellite or beams from a different satellite in the same band.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for improving link performance for a user terminal (UT) in a satellite network, the method comprising:
providing a first beam servicing a first service area sharing an edge with a second service area serviced by a second beam and other beams servicing other service areas;
transmitting, from the UT disposed in the first service area in an area close to the edge, a transmission via the first beam to a receiver via a satellite;
relaying, by the satellite, the first beam, the second beam, and the other beams;
beamforming the first beam and the second beam at the receiver;
extracting the first beam and a remnant signal of the first beam from the second beam and suppressing the other beams; and
processing the first beam and the remnant signal jointly to receive the transmission with an improved signal to noise ratio (SNR) as compared to an SNR of the transmission alone,
wherein the remnant signal comprises a portion of the transmission as received at the satellite within the second beam.

2. The method of claim 1 wherein the first beam comprises a return link.

3. The method of claim 1 wherein the remnant signal comprises a side-lobe of the transmission or a signal below 3 dB of a main-lobe peak of the transmission.

4. The method of claim 1 wherein the transmission comprises a linearly polarized signal and the satellite maps the linearly polarized signal to a circularly polarized signal.

5. The method of claim 1 wherein the transmission comprises a linearly polarized signal and the satellite maps the linearly polarized signal to two circularly polarized signals.

6. The method of claim 1 wherein the first beam and the second beam are diverse by a carrier frequency, a polarization or a combination thereof.

7. The method of claim 1 wherein the satellite comprises a first satellite to service the first beam and a second satellite to service the second beam.

8. The method of claim 7 wherein a definition of the first beam complements a definition of the second beam.

9. The method of claim 7 wherein a center of the first beam is disposed near an edge of a service area of the second beam.

10. The method of claim 7 wherein the processing determines communication via the first satellite is blocked, when the first beam comprises a zero signal and a portion of the remnant signal attributable to the second satellite comprises a non-zero signal.

11. The method of claim 1 wherein the area close to the edge comprises an area in an outer one third radius region away from a beam center of the first service area.

12. A system to improve link performance for a user terminal (UT) in a satellite network, the system comprising:
a satellite to
receive a first beam servicing a first service area sharing an edge with a second service area serviced by a second beam and other beams servicing other service areas; and
relay the first beam, the second beam and the other beams;
the UT to transmit, from the first service area in an area close to the edge, a transmission via the first beam to a receiver via the satellite;
a ground based beam former (GBFF) to beamform the first beam and the second beam at the receiver;
a gateway to extract the first beam and a remnant signal of the first beam from the second beam while suppressing the other beams; and
a Base Station to process the first beam and the remnant signal jointly to receive the transmission with an improved signal to noise ratio (SNR) as compared to an SNR of the transmission alone,
wherein the remnant signal comprises a portion of the transmission as received at the satellite within the second beam.

13. The system of claim 12 wherein the first beam comprises a return link.

14. The system of claim 12 wherein the remnant signal comprises a side-lobe of the transmission or a signal below 3 dB of a main-lobe peak of the transmission.

15. The system of claim 12 wherein the transmission comprises a linearly polarized signal and the satellite maps the linearly polarized signal to a circularly polarized signal.

16. The system of claim 12 wherein the transmission comprises a linearly polarized signal and the satellite maps the linearly polarized signal to two circularly polarized signals.

17. The system of claim 12 wherein the first beam and the second beam are diverse by a carrier frequency, a polarization or a combination thereof.

18. The system of claim 12 wherein the satellite comprises a first satellite to service the first beam and a second satellite to service the second beam.

19. The system of claim 18 wherein a definition of the first beam complements a definition of the second beam.

20. The system of claim 18 wherein a center of the first beam is disposed near an edge of a service area of the second beam.

21. The system of claim 18 wherein the Base Station determines that communication via the first satellite is blocked, when the first beam comprises a zero signal and a portion of the remnant signal attributable to the second satellite comprises a non-zero signal.

* * * * *